(12) United States Patent  
Koga et al.

(10) Patent No.: US 8,040,998 B1  
(45) Date of Patent: Oct. 18, 2011

(54) FUEL ASSEMBLY

(75) Inventors: Tomonari Koga, Abiko (JP); Satoshi Nishimura, Komae (JP); Izumi Kinoshita, Komae (JP); Shoichi Moriya, Abiko (JP); Yasushi Tsuboi, Yokohama (JP); Mitsuo Wakamatsu, Kawasaki (JP); Yoshiaki Sakashita, Yokohama (JP); Masatoshi Nakagawa, Yokohama (JP)

(73) Assignees: Kabushiki Kaisha Toshiba, Tokyo (JP); Central Research Institute of Electric Power Industry, Tokyo (JP)

( * ) Notice: Subject to any disclaimer, the term of this patent is extended or adjusted under 35 U.S.C. 154(b) by 790 days.

(21) Appl. No.: 11/616,121

(22) Filed: Dec. 26, 2006

(30) Foreign Application Priority Data

Dec. 27, 2005 (JP) ................................. 2005-374774

(51) Int. Cl.  
*G21C 3/32* (2006.01)

(52) U.S. Cl. ......... 376/448; 376/453; 376/462; 376/361

(58) Field of Classification Search .................. 376/448, 376/453, 462, 361  
See application file for complete search history.

(56) References Cited

U.S. PATENT DOCUMENTS

| | | | | |
|---|---|---|---|---|
| 4,053,359 A | * | 10/1977 | Pennell et al. | 376/365 |
| 4,568,512 A | * | 2/1986 | Jolly | 376/442 |
| 4,655,997 A | * | 4/1987 | Aspden | 376/289 |
| 4,663,117 A | * | 5/1987 | Jolly et al. | 376/442 |
| 4,751,043 A | * | 6/1988 | Freeman et al. | 376/400 |
| 5,147,600 A | * | 9/1992 | Kadono et al. | 376/462 |
| 5,319,692 A | * | 6/1994 | Hopkins et al. | 376/458 |

OTHER PUBLICATIONS

Matthews, "Irradiation Performance of Nitride Fuels", LA-UR-93/2392, 1993.*  
Merriam-Webster's Collegiate Dictionary, 10th edition, 1993, pp. 423, 440 and 441.*

* cited by examiner

*Primary Examiner* — Rick Palabrica  
(74) *Attorney, Agent, or Firm* — Oblon, Spivak, McClelland, Maier & Neustadt, L.L.P.

(57) ABSTRACT

A fuel assembly is charged in a reactor core of a nuclear reactor using a liquid metal as a coolant, and includes a wrapper tube storing a plurality of fuel pins and including an entrance nozzle for introducing the coolant and an operation handling head, grids disposed in the wrapper tube to support the fuel pins in the radial direction of the wrapper tube, liner tubes inserted in the wrapper tube to fixedly hold the respective grids in the axial direction of the wrapper tube, and a fixing device for fixing the grids and the liner tubes in the radial direction of the wrapper tube.

5 Claims, 14 Drawing Sheets

(a)

(b)

FUEL ASSEMBLY

BACKGROUND OF THE INVENTION

1. Field of the Invention

The present invention relates to a fuel assembly for a nuclear reactor using a coolant such as a liquid metal, and particularly to a fuel assembly which is configured to store and hold a plurality of fuel pins in a wrapper tube by using grids and liner tubes and which suppresses an unnecessary flow of the coolant in an outer circumferential side in the wrapper tube and increases the flow volume of the coolant passing through interiorly disposed ones of the fuel pins to thereby increase the core power.

2. Related Art

Generally, in a nuclear reactor, a fuel assembly is supported in a reactor core while being attached to a support member. In a nuclear reactor using a coolant such as a liquid metal, an electromagnetic pump is used as a drive source to circulate the coolant around a plurality of fuel pins included in the fuel assembly supported in the reactor core. In this case, if the nuclear reactor is small-sized, the fuel assembly is configured to store the fuel pins in a wrapper tube to enable the circulation of the coolant with no need for the drive source. The wrapper tube is configured to include an entrance nozzle at a lower end thereof for introducing the coolant, and an operation handling head at an upper end thereof. The wrapper tube includes therein grids for supporting the fuel pins in the radial direction of the wrapper tube, and liner tubes inserted in the wrapper tube for fixedly holding the respective grids in the axial direction of the wrapper tube. The intervals in the radial direction of the fuel pins are kept by the grids. Meanwhile, the intervals in the axial direction of the grids are kept by a tie rod, the liner tubes, or the like (see Japanese Unexamined Patent Application Publication No. 6-174882, for example).

FIGS. 23 and 24 illustrate the configuration of this type of conventional fuel assembly. In the figures, a plurality of fuel pins 101 are stored in a wrapper tube 103, with the pin intervals of the fuel pins 101 being kept by grids 102. Each of the fuel pins 101 is fixed at a lower portion thereof by a lower pin support plate 105 and at an upper portion thereof by an upper pin support plate 106. The coolant such as a liquid metal flows in from a coolant inlet 108 of an entrance nozzle 104 and flows out from a coolant outlet 109 of a handling head 107.

In the thus configured fuel assembly, as illustrated in FIG. 25, each of the grids 102, which has a low pressure drop, includes a grid frame 102a provided with a multitude of ring-shaped pin support members 110. As illustrated in FIG. 26, for example, each of the pin support members 110 is provided with three dimples 110a on the inside thereof such that the circumference of the corresponding fuel pin 101 is three-point supported, for example, by the dimples 110a.

FIG. 27 illustrates a deformation state in which the wrapper tube 103 is expanded by the thermal expansion. That is, the wrapper tube 103, the basic form of which is a regular hexagon as indicated by a virtual line in FIG. 27, is expanded when used due to the irradiation deformation and is deformed so as to expand toward the outer circumference thereof as indicated by a solid line. Conventionally, to cope with such deformation, liner tubes each formed by a thin hexagonal tube are provided outside a fuel bundle such that the liner tubes and the grids are alternately stacked. Thereby, the intervals in the axial direction of the grids are kept.

In such a configuration, however, the flow passage area around the fuel bundle is large. Thus, the cladding temperature in a central area of the fuel bundle becomes relatively high in some cases. Therefore, there arises a need to keep the cladding temperature equal to or lower than a cladding temperature limit. As a result, the thermal efficiency is decreased.

To address this issue, the inventors of the subject application have proposed a technique for reducing the cladding temperature, in which followers each having a triangular cross section are provided to reduce the flow passage area of a bundle edge sub-channel in a core heat generation unit for preventing a peripheral flow. That is, according to the technique, the liner tubes are provided with peripheral flow preventing projections to suppress the occurrence of the above-described phenomenon (see "Development of Densely. Packed and Low-Pressure-Drop Fuel Assembly for Non-Refueling Core (3)," 2004 Fall Meeting Preliminary Proceedings 307 of the Atomic Energy Society of Japan, for example).

Meanwhile, in the above-described conventional configuration, the liner tubes and the grids are stacked and may be mutually misaligned in the radial direction. If the liner tubes and the grids are misaligned in the radial direction, an opening may be formed between the wrapper tube and the liner tubes to allow the coolant to flow from inside the liner tubes into the space on the wrapper tube side as a waste flow.

Further, in the conventional fuel assembly, the bulging deformation occurs in the wrapper tube by the irradiation creep due to the inner pressure of the wrapper tube. It is therefore possible in the expanded portion that the flow passage area of a peripheral region around the fuel bundle is increased while the flow volume of the coolant in the central area of the fuel bundle is reduced, and thus that the cladding temperature is increased. It is also possible that the liner tubes are similarly expanded due to the inner pressure applied thereto.

SUMMARY OF THE INVENTION

The present invention has been made in light of the above-described circumferences, and it is an object of the present invention to provide a fuel assembly which achieves a high thermal efficiency and a stable lifetime performance by preventing an unnecessary flow of a coolant in an outer circumferential area therein and by causing the coolant to effectively flow toward interiorly disposed fuel pins.

To achieve the above object, the present invention provides a fuel assembly charged in a reactor core of a nuclear reactor using a liquid metal as a coolant. The fuel assembly includes a wrapper tube, grids, liner tubes, and a fixing device. The wrapper tube includes an entrance nozzle for introducing the coolant and an operation handling head, and stores a plurality of fuel pins. The grids are disposed in the wrapper tube to support the fuel pins in the radial direction of the wrapper tube. The liner tubes are inserted in the wrapper tube to fixedly hold the respective grids in the axial direction of the wrapper tube. The fixing device fixes the grids and the liner tubes in the radial direction of the wrapper tube.

Further, in a preferable embodiment of the fuel assembly, the fixing device may include pins for fixing joining ends of the grids and the liner tubes along the radial direction of the wrapper tube.

Furthermore, the fixing device may further include pin support portions, which are through holes formed on an outer circumferential side of a grid frame of each of the grids at positions corresponding to positions of engaging portions of the liner tubes, and through which the pins can be inserted in the vertical direction.

The fuel assembly may further include a coolant blocking member for preventing the coolant from flowing in a gap between the inner circumference of the wrapper tube and the outer circumference of each of the liner tubes. The coolant blocking member may include contact pieces, which project from an outer circumferential side of the liner tube to come in contact with the inner surface of the wrapper tube, and which are formed of an elastic material capable of increasing the range of closure in accordance with the expansion of the wrapper tube.

The coolant blocking member may be a skirt-shaped member hanging from an upper end portion of the liner tube along the outer circumferential surface of the liner tube, and may include a plurality of divided pieces divided by vertically extending grooves to individually come in contact with the inner circumferential surface of the wrapper tube. It is preferable to form the coolant blocking member from a high nickel steel.

Further, the inner circumferential surface of a grid frame of each of the grids may be formed with a plurality of projections for closing gaps between outer peripherally disposed ones of the fuel pins. The projections may be formed in accordance with the pin pitch of the fuel pins.

Furthermore, the fuel assembly may have a structure in which at least either one of a grid frame of each of the grids and a peripheral wall of each of the liner tubes is formed as a concave and convex wall bent toward the inner circumference thereof, and in which parts of the concave and convex wall projecting toward the inner circumference thereof close gaps between outer peripherally disposed ones of the fuel pins. An end portion of either one of the grid frame and the liner tube may be provided with closure portions for closing a space on the outer circumferential side of the parts of the concave and convex wall closing the gaps between the outer peripherally disposed ones of the fuel pins.

The inner circumferential surface of each of the liner tubes may be provided with a plurality of rod members extending along the axial direction. Each of the rod members may have a substantially angular cross section and be disposed in accordance with the pin pitch of the fuel pins to close gaps between outer peripherally disposed ones of the fuel pins.

Further, an upper end portion in the wrapper tube may be provided with an upper pin support plate for supporting the fuel pins, and the upper pin support plate may be pierced through by a tie rod, the upper end of which presses and holds downward the grids and the liner tubes via an elastic member. It is preferable to form the elastic member by a compression coil spring.

Furthermore, a peripheral wall of each of the liner tubes may be drilled with a plurality of holes piercing through the peripheral wall to allow the coolant to flow between a space on the side of the wrapper tube and a space on the side of the fuel pins.

According to the present invention, with the provision of the fixing device for fixing the end portions of the grids and the liner tubes in the radial direction, a gap can be prevented from being formed between the grids and the liner tubes by a positional misalignment in the radial direction. Therefore, the unnecessary flow of the coolant can be prevented, and the improvement of the thermal efficiency of the fuel assembly and the stabilization of the lifetime performance of the fuel assembly can be achieved.

Further characteristics of the present invention will be made clearer from the following detailed description with reference to the accompanying drawings.

DESCRIPTION OF THE PREFERRED EMBODIMENTS

Embodiments of a fuel assembly according to the present invention will be described below with reference to FIGS. 1 to 22.

First Embodiment

FIGS. 1 to 7

Figure 1:
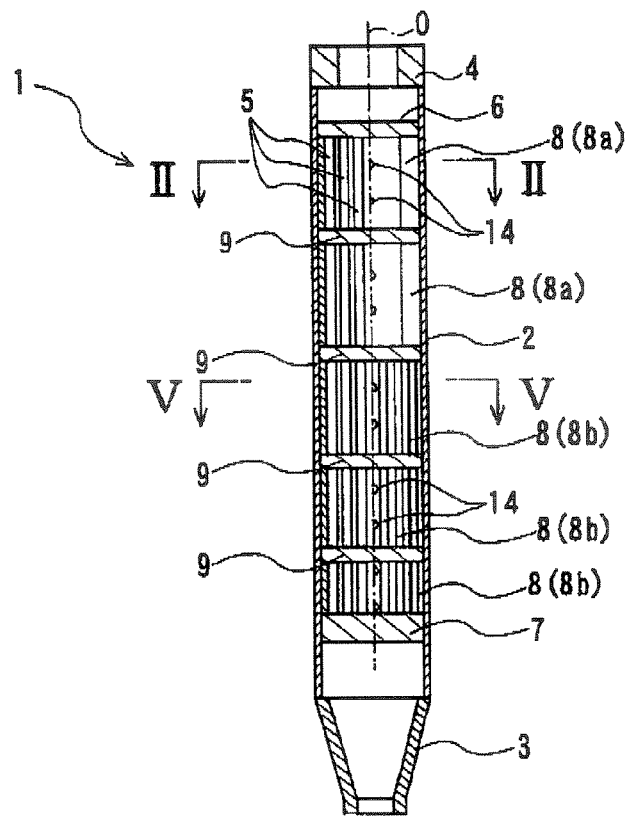
FIG. 1 is a schematic overall cross-sectional view illustrating a first embodiment of a fuel assembly according to the present invention.

FIG. 1 is a schematic overall cross-sectional view illustrating a first embodiment of the fuel assembly according to the present invention. FIG. 1 illustrates a state in which only a wrapper tube, described hereinafter, is cut out in a right half of the figure from a center line O and liner tubes included in the wrapper tube are also cut out in a left half of the figure from the center line O.

As illustrated in FIG. 1, a fuel assembly 1 according to the present embodiment includes a vertically long wrapper tube 2. The wrapper tube 2 includes an entrance nozzle 3 at a lower end portion thereof and a handling head 4 at an upper end portion thereof. The wrapper tube 2 stores therein a plurality of vertically long fuel pins 5 extending parallel to one another. The fuel pins 5 are supported at upper and lower end portions thereof by an upper pin support plate 6 provided at an upper end position within the wrapper tube 2 and by a lower pin support plate 7 provided at a lower end position within the wrapper tube 2.

Inside the wrapper tube 2, a plurality of grids 9 are disposed at intervals in the vertical direction (i.e., the axial direction) suitable for holding the fuel pins 5 at regular intervals in the radial direction. Further, liner tubes 8 are provided inside the wrapper tube 2 so as to be in contact with the respective grids 9 to support the grids 9 in the axial direction. That is, the grids 9 and the liner tubes 8 are disposed to be alternately adjacent to each other along the axial direction of the wrapper tube 2.

Figure 2:
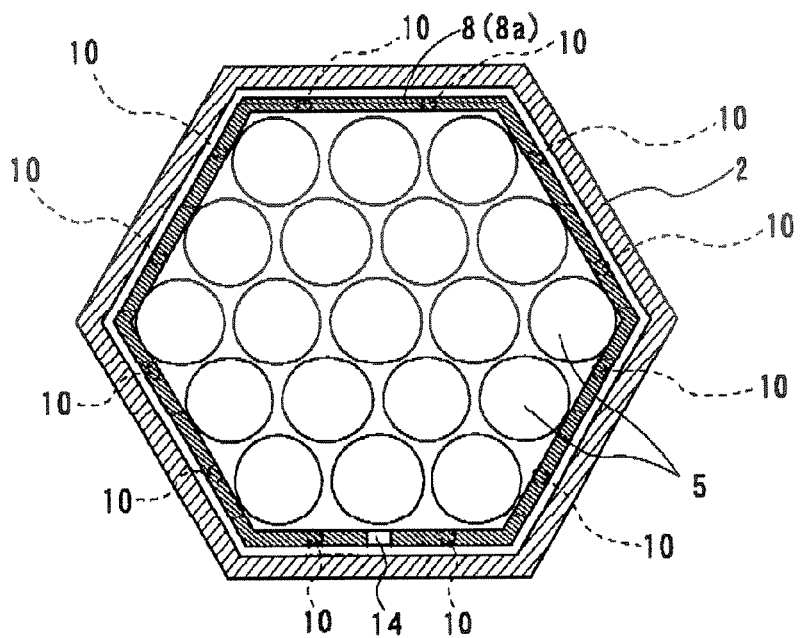
FIG. 2 is an enlarged cross-sectional view of FIG. 1 taken along the line II-II in FIG. 1.

FIG. 2 is an enlarged cross-sectional view (i.e., a transverse cross-sectional view) of FIG. 1 taken along the line II-II line in FIG. 1, which illustrates two liner tubes 8 (8a) disposed on the upper end side of the wrapper tube 2 and the internal structure of the liner tubes. Further, FIG. 3 illustrates a lateral shape of the liner tube 8 (8a) illustrated in FIG. 2 (the wrapper tube 2 is omitted).

Figure 3:
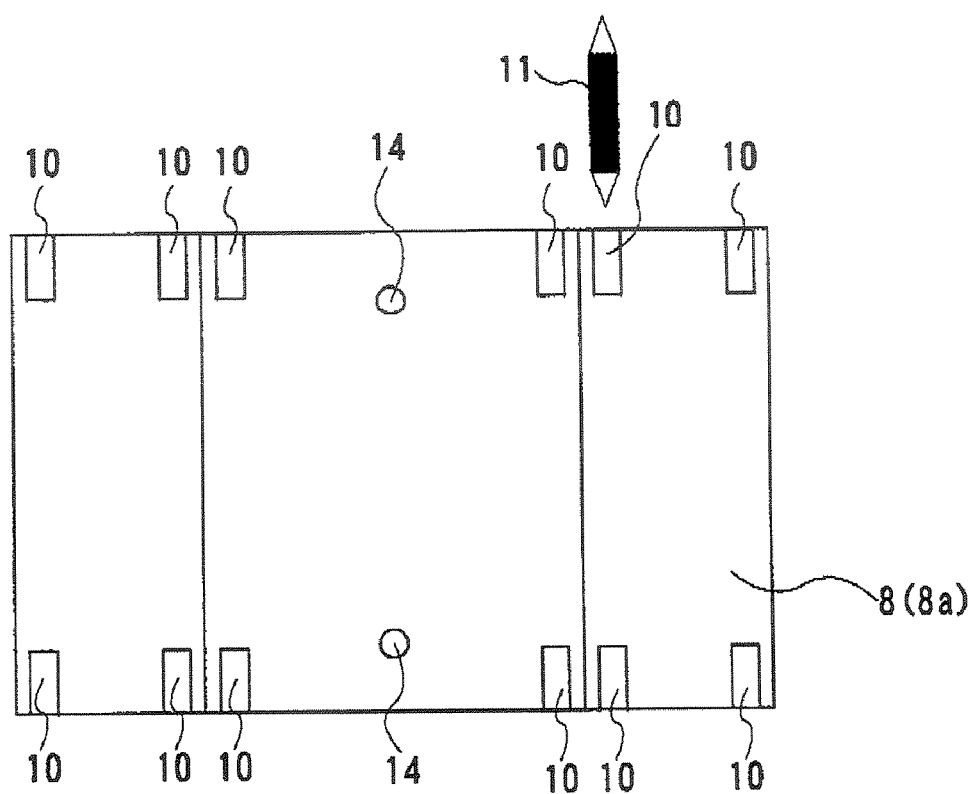
FIG. 3 is a side view of the liner tube illustrated in FIG. 2.

As illustrated in FIGS. 1 to 3, the wrapper tube 2 and the liner tube 8 (8a) both have a cross-section of a regular hexagonal shape. Each of the two liner tubes 8 (8a) disposed on the upper side of the fuel assembly 1, for example, is drilled with communication holes 14 penetrating the tube wall of the liner tube. The communication holes 14 communicate the space inside the liner tube 8 (8a) with the space between the wrapper tube 2 and the liner tube 8 (8a). In a nuclear reactor operation, therefore, a coolant can freely flow between the space inside the liner tube 8 (8a) and the space formed between the wrapper tube 2 and the liner tube 8 (8a). As the coolant flows from a high fluid pressure side to a low fluid pressure side, the liquid pressure is constantly kept uniform between the two spaces in the operation.

In the example illustrated in FIGS. 1 to 3, the communication holes 14 are formed at two positions in the vertical direction in one of the surfaces of each of the liner tubes 8 (8a). However, the disposition, the number, and the like of the communication holes 14 are not particularly limited.

Further, as illustrated in FIGS. 2 and 3, engaging portions 10 formed by grooves, holes, or the like are provided to open upward and toward the outer circumferential side, for example, at respective positions in the vicinity of the upper end corners of the respective surfaces forming each of the liner tubes 8 (8a). The engaging portions 10 formed by grooves, holes, or the like are also provided to open downward and toward the outer circumferential side, for example, at respective positions in the vicinity of the lower end corners of the respective surfaces forming each of the liner tubes 8 (8a). Furthermore, as illustrated in FIG. 3, a latch pin 11 of a predetermined length is provided for each of the engaging portions 10 so that end portions of the latch pin 11 can be inserted in the corresponding engaging portions 10 formed by grooves or the like.

Figure 4:
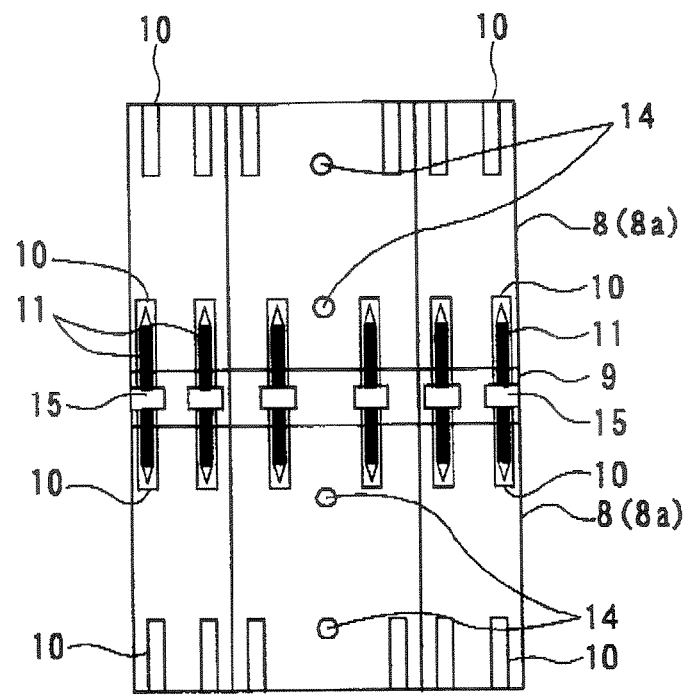
FIG. 4 is a side view illustrating a connection structure of the liner tube illustrated in FIG. 3.
Figure 25:
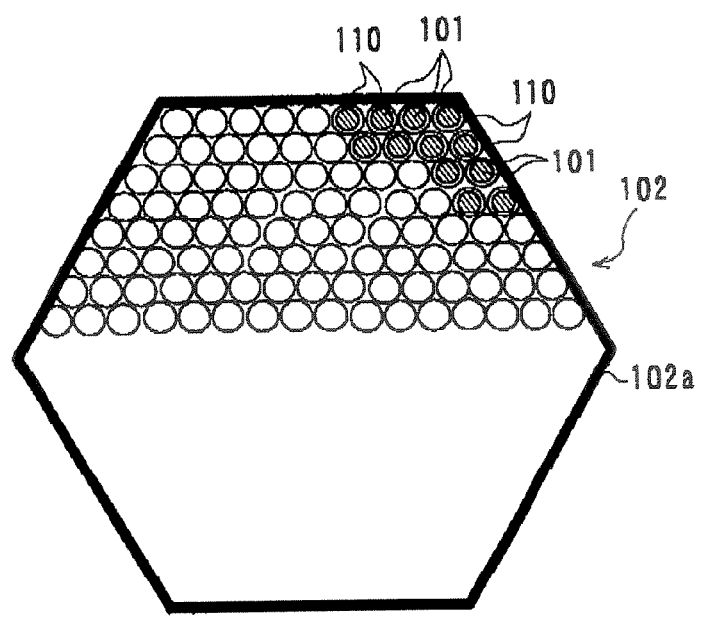
FIG. 25 is a schematic view illustrating a grid of the conventional example.
Figure 26:
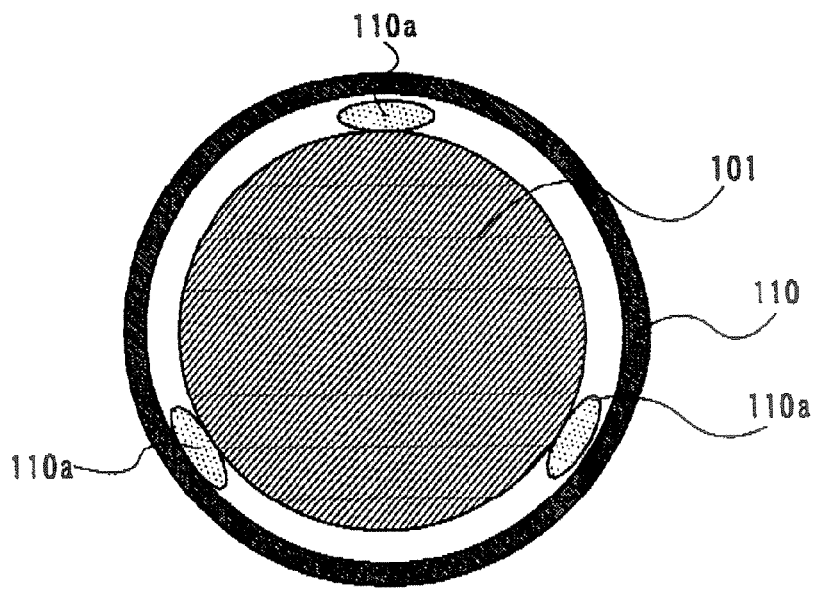
FIG. 26 is a schematic view illustrating a pin support member of the grid of the conventional example.
Figure 27:
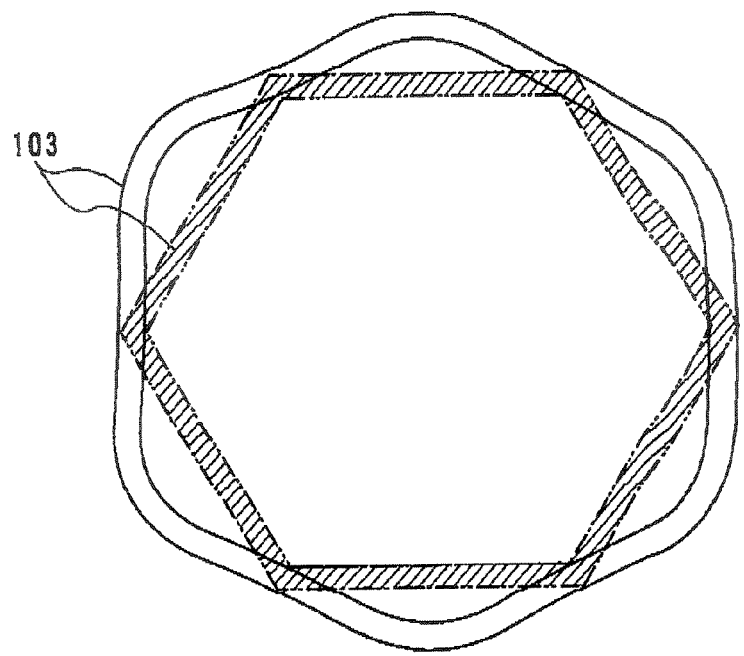
FIG. 27 is a plan view for explaining the expansion of a wrapper tube.

FIG. 4 illustrates a state in which a pair of upper and lower liner tubes 8 (8a) and a grid 9 disposed therebetween are connected together with the engaging portions 10 and the latch pins 11. The grid 9 is formed by a grid frame of a regular hexagonal shape and a plurality of fuel pin support rings provided inside the grid frame (see FIGS. 25 and 26, for example). As illustrated in FIG. 4, pin support portions 15 are provided on an outer circumferential side of the grid frame of the grid 9 in an arrangement corresponding to the arrangement of the engaging portions 10 of the liner tubes 8 (8a). Each of the pin support portions 15 is formed as a through hole or the like formed on the outer circumferential side of the grid frame, for example, and is configured to be inserted with the vertically set latch pin 11 in the vertical direction and to support a central portion of the latch pin 11 from the outer circumferential side.

In the above-described configuration, the grid 9 is disposed between the pair of the upper and lower liner tubes 8 (8a), and the central portions of the latch pins 11 are supported by the pin support portions 15 of the grid 9. Further, the upper and lower end portions of the latch pins 11 are inserted in the engaging portions 10 of the upper and lower liner tubes 8 (8a), which are formed by grooves or the like. Therefore, the upper and lower liner tubes 8 (8a) and the grid 9 can be vertically connected together, with the outer circumferential surfaces of the three components being aligned to one another. According to such configuration, the vertically adjacent liner tubes 8 (8a) and the grid 9 are fixed to one another in the radial direction. That is, a gap is prevented from being formed between the liner tubes 8 (8a) and the grid 9 by a positional misalignment in the radial direction. Accordingly, it is possible to prevent an unnecessary flow of the coolant and to thereby improve the thermal efficiency of the fuel assembly and stabilize the lifetime performance of the fuel assembly.

Figure 5:
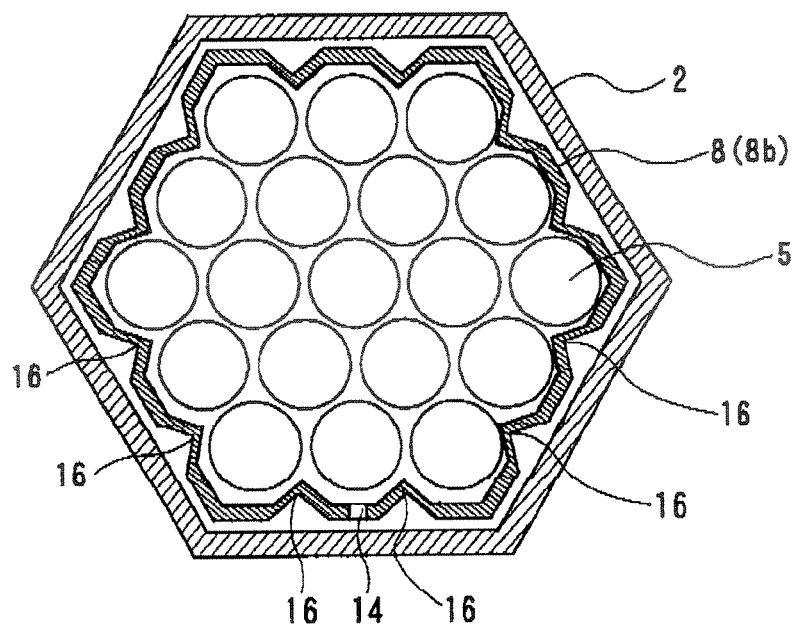
FIG. 5 is an enlarged cross-sectional view taken along the line V-V in FIG. 1.
Figure 6:
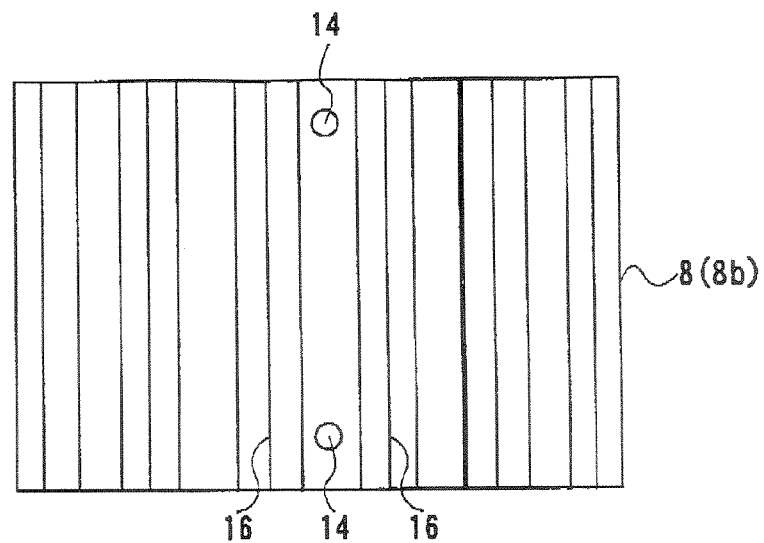
FIG. 6 is a side view of the liner tube illustrated in FIG. 5.

Description will now be made of the configuration of a lower part of the fuel assembly 1 according to the present embodiment. FIG. 5 is an enlarged cross-sectional view taken along the line V-V in FIG. 1, which illustrates the configuration of liner tubes 8 (8b) of the fuel assembly 1 disposed below the two upper liner tubes 8 (8a), for example. FIG. 6 is a side view of the liner tube 8 (8b) illustrated in FIG. 5.

The liner tube 8 (8b) illustrated in FIGS. 5 and 6 is in the shape of a cylinder, the basic form of which is a regular hexagon. The liner tube 8 (8b) is configured such that the peripheral wall corresponding to the respective sides of the liner tube 8 (8b) is partially bent toward the inner circumference thereof to form angular concavities and convexities that fill gaps between peripherally disposed ones of the fuel pins 5. With such concavities and convexities, angular portions (i.e., triangular convexities) 16 are formed as peripheral flow preventing projections projecting toward the inner surface of the liner tube 8 (8b). Accordingly, the gaps between the peripherally disposed ones of the fuel pins 5 can be closed. Further, a peripheral flow preventing structure is formed which prevents the coolant from passing through the space between the fuel pins 5 and the inner circumference of the liner tube 8 (8b) and flowing upward.

Figure 7:
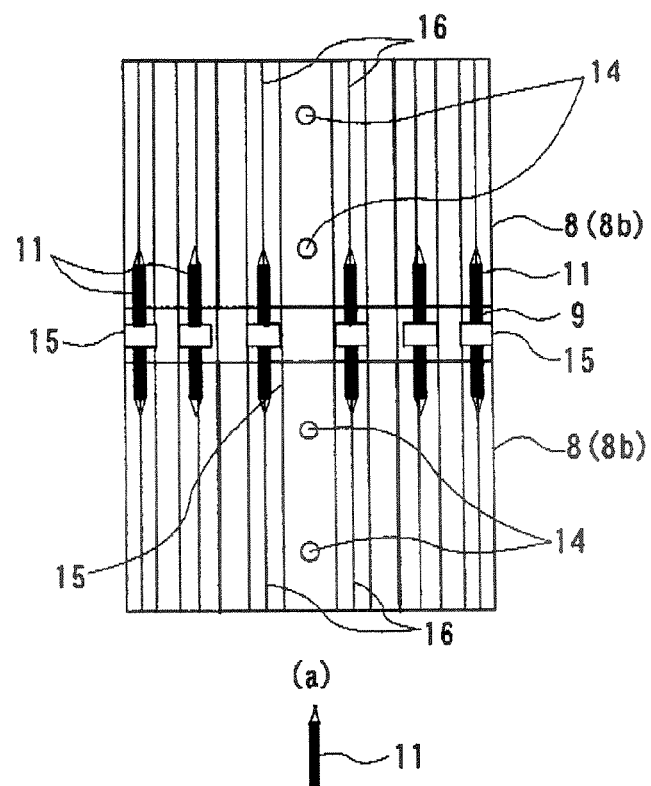
FIG. 7 is a side view illustrating a connection structure of the liner tube illustrated in FIG. 6.

Similarly, as illustrated in FIG. 7, the peripheral wall corresponding to the respective sides of the grid frame of the grid 9, having the regular hexagonal basic form, is partially bent toward the inner circumference thereof. Thus, the grid frame has angular portions that fill the gaps between the peripherally disposed ones of the fuel pins 5.

In the above-described configuration, each of the liner tubes 8 (8b) is drilled with the communication holes 14 penetrating the tube wall of the liner tube. The communication holes 14 communicate the space inside the liner tube 8 (8b) with the space between the wrapper tube 2 and the liner tube 8 (8b). In the nuclear reactor operation, therefore, the coolant can freely flow between the space inside the liner tube 8 (8b) and the space formed between the wrapper tube 2 and the liner tube 8 (8b). As the coolant flows from a high fluid pressure side to a low fluid pressure side, the liquid pressure is constantly kept uniform between the two spaces in the operation. In the example illustrated in FIGS. 5 to 7, the communication holes 14 are formed at two positions in the vertical direction in one of the surfaces of each of the liner tubes 8 (8b). However, the arrangement, the number, and the like of the communication holes 14 are not particularly limited.

As described above, each of the sides of the liner tube 8 (8b) has the cross section having the concavities and convexities. Parts of the outer circumferential surface of the side corresponding to the angular portions 16 form the concavities. In the present configuration, therefore, there is no need to provide the engaging portions 10 illustrated in FIGS. 3 and 4, and the concavities of the angular portions 16 can be used as the engaging portions engaged with the latch pins 11.

FIG. 7 illustrates a state in which a pair of upper and lower liner tubes 8 (8b) and a grid 9 disposed therebetween are connected together with the angular portions 16, which serve as the engaging portions, and the latch pins 11. Similarly to each of the liner tubes 8 (8b), the grid 9 is configured to have an outer circumferential surface having concavities formed by angular portions. Therefore, substantially similarly to FIG. 4, the pin support portions 15 are provided in an arrangement corresponding to that of the concavities of the liner tubes 8 (8b). In this way, each of the lower liner tubes 8 (8b) and grids 9 of the present embodiment can be attached with the latch pins 11 on the outer circumference thereof, with no need of being formed with the grooves or the like.

Accordingly, the upper and lower liner tubes 8 (8b) and the grid 9 can be vertically connected together, with the outer circumferential surfaces of the three components being aligned to one another, by disposing the grid 9 between the pair of the upper and lower liner tubes 8 (8b), causing the pin support portions 15 of the grid 9 to support the central portions of the latch pins 11, and inserting the upper and lower end portions of the latch pins 11 in the concavities of the outer circumferential surfaces of the upper and lower liner tubes 8 (8b), which are formed by the angular portions 16.

With this configuration, the vertically adjacent liner tubes 8 (8b) and the grid 9 can be fixed to one another in the radial direction. Thus, with a relatively small number of processes, a gap is prevented from being formed between the liner tubes 8 (8b) and the grid 9 by a positional misalignment in the radial direction. Accordingly, it is possible to prevent the unnecessary flow of the coolant, and thus, to improve the thermal efficiency of the fuel assembly and stabilize the lifetime performance of the fuel assembly, for example.

It is preferable to set the thickness of the liner tube so as to prevent a gap from being formed in a joining area of the grid and the liner tube, even if a lateral misalignment is caused by the amount of a gap between the wrapper tube and the liner tube.

Second Embodiment

FIGS. 8 to 17

In a second embodiment of the present invention, description will be made of a fuel assembly including a coolant blocking member 17 for preventing the coolant from flowing in a gap between the inner circumference of the wrapper tube 2 and the outer circumference of the liner tube 8 (8b).

Figure 8:
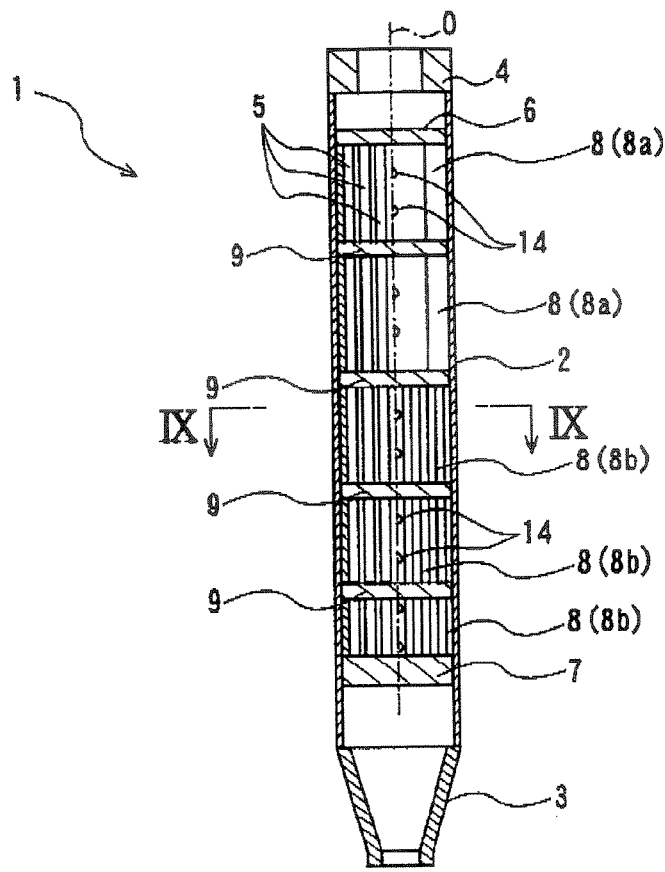
FIG. 8 is a schematic view illustrating a second embodiment of the fuel assembly according to the present invention.

FIG. 8 is a schematic overall cross-sectional view illustrating the second embodiment of the fuel assembly according to the present invention. FIG. 8 illustrates a state in which only a wrapper tube is cut out in a right half of the figure from a center line O and liner tubes included in the wrapper tube are also cut out in a left half of the figure from the center line O.

As illustrated in FIG. 8, a fuel assembly 1 according to the present embodiment includes a vertically long wrapper tube 2. The wrapper tube 2 has an entrance nozzle 3 at a lower end portion thereof and a handling head 4 at an upper end portion thereof. The wrapper tube 2 stores therein a plurality of vertically long fuel pins 5 extending parallel to one another. The fuel pins 5 are supported at upper and lower end portions thereof by an upper pin support plate 6 provided at an upper end position within the wrapper tube 2 and by a lower pin support plate 7 provided at a lower end position within the wrapper tube 2.

Inside the wrapper tube 2, a plurality of grids 9 are disposed at intervals in the vertical direction (i.e., the axial direction) to hold the fuel pins 5 at regular intervals in the radial direction. Further, liner tubes 8 are provided inside with the wrapper tube 2 to be in contact with the respective grids 9 to support the grids 9 in the axial direction. That is, the grids 9 and the liner tubes 8 are disposed to be alternately adjacent to each other along the axial direction of the wrapper tube 2.

The present embodiment is similar to the above-described first embodiment in two liner tubes 8 (8a) disposed on the upper end side of the wrapper tube 2 and in the internal structure of the liner tubes. Therefore, description of the liner tubes 8 (8a) and the internal structure thereof will be omitted.

Figure 9:
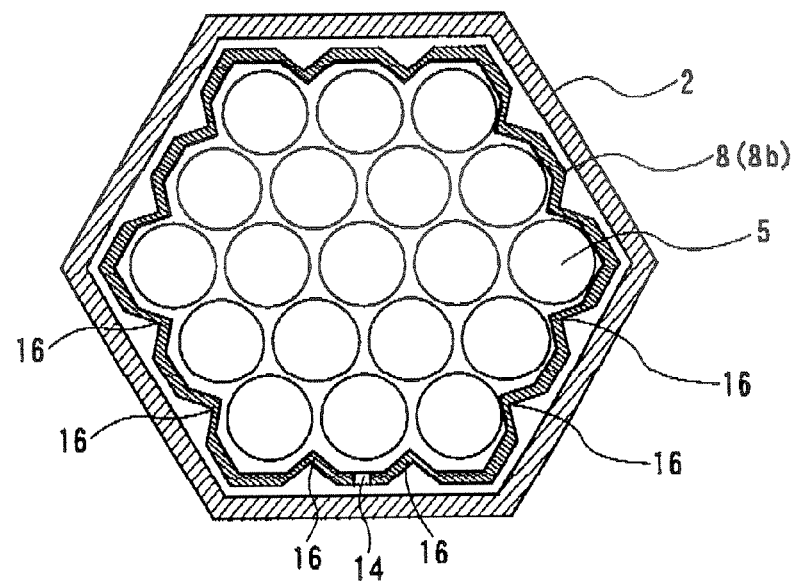
FIG. 9 is an enlarged cross-sectional view taken along the line IX-IX in FIG. 8.

In the present embodiment, description will be mainly made of the configuration of liner tubes 8 (8b) disposed below the two upper liner tubes 8 (8a). FIG. 9 is an enlarged cross-sectional view of FIG. 8 taken along the IX-IX line, and FIG. 10 is a transverse cross-sectional view extracting and illustrating only the liner tube 8 (8b) illustrated in FIG. 9.

As illustrated in the above figures, in the present embodiment, the liner tube 8 (8b) is in the shape of a cylinder, the basic form of which is a regular hexagon. The liner tube 8 (8b) is configured such that the peripheral wall corresponding to the respective sides of the liner tube 8 (8b) is bent toward the inner circumference thereof to form angular concavities and convexities that fill gaps between peripherally disposed ones of the fuel pins 5. With such concavities and convexities, angular portions (i.e., triangular convexities) 16 are formed as peripheral flow preventing projections projecting toward the inner surface of the liner tube 8 (8b). Accordingly, the gaps between the peripherally disposed ones of the fuel pins 5 can be closed. Further, a peripheral flow preventing structure is formed which prevents the coolant from passing through the space between the fuel pins 5 and the inner circumference of the liner tube 8 (8b) and flowing upward.

Figure 10:
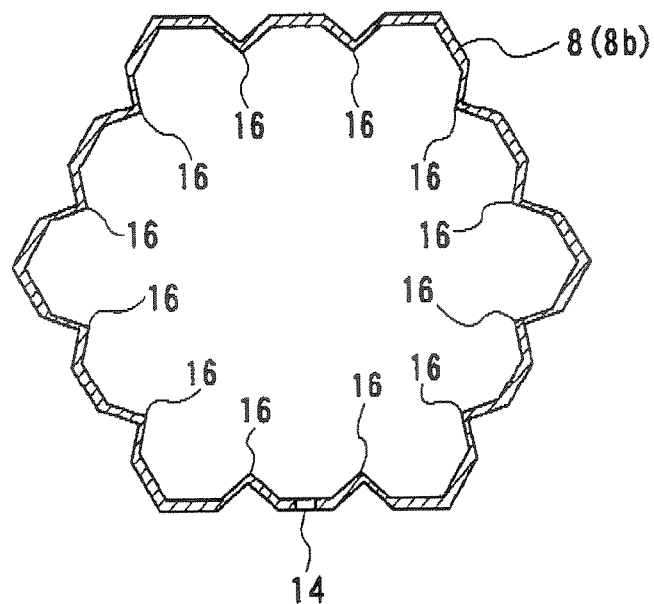
FIG. 10 is a transverse cross-sectional view of the liner tube illustrated in FIG. 9.

That is, as illustrated in FIG. 10, the present embodiment has a structure in which the peripheral wall of the liner tube 8 (8b) is formed as a concave and convex wall bent toward the inner circumference thereof, and in which the gaps between the outer peripherally disposed ones of the fuel pins 5 are closed by parts of the concave and convex wall projecting toward the inner circumference thereof. Further, an end portion of the liner tube 8 (8b) is provided with closure portions 19 for closing the space on the outer circumferential side of the parts of the concave and convex wall closing the gaps between the outer peripherally disposed ones of the fuel pins 5.

Although not illustrated, the inner circumferential surface of a grid frame of the grid 9 may be also provided with a plurality of projections for closing the gaps between the outer peripherally disposed ones of the fuel pins 5, and the projections may be formed in accordance with the pin pitch of the fuel pins 5.

That is, the present embodiment has a structure in which at least one of the grid frame of the grid 9 and the peripheral wall of the liner tube 8 (8b) is formed as the concave and convex wall bent toward the inner circumference thereof, and in which the parts of the concave and convex wall projecting toward the inner circumference thereof close the gaps between the outer peripherally disposed ones of the fuel pins 5.

With reference to FIGS. 11 to 17, description will be then made of the liner tube 8 (8b) provided with the coolant blocking member 17 for preventing the coolant from flowing in the gap between the inner circumference of the wrapper tube 2 and the outer circumference of the liner tube 8 (8b).

Figure 11:
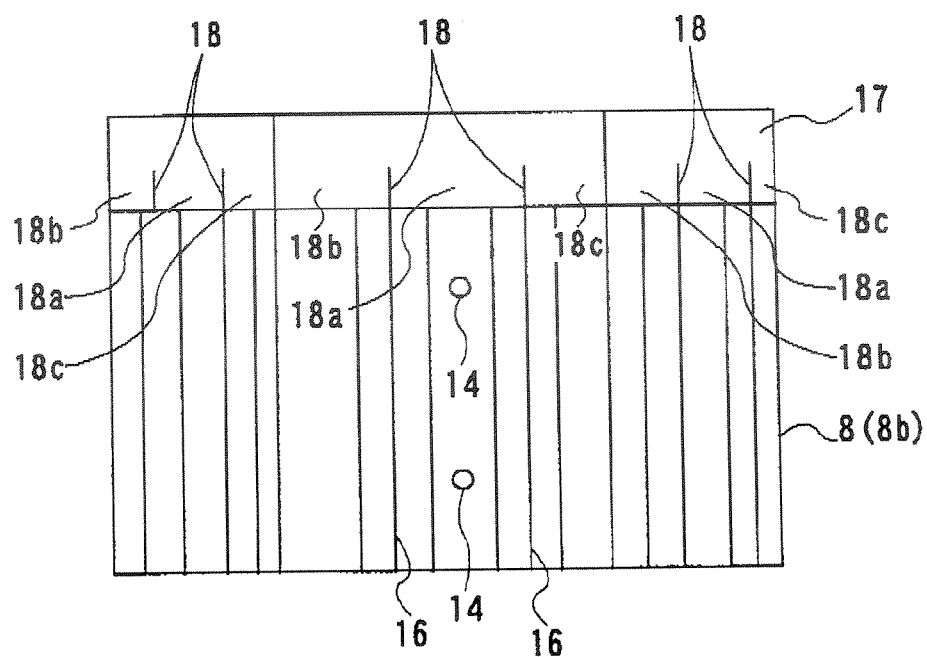
FIG. 11 is an explanatory view of a coolant blocking member according to the second embodiment of the present invention.

As illustrated in FIG. 11, the coolant blocking member 17 includes contact pieces 18a, 18b, and 18c, which are positioned on an upper end side of the liner tube 8 (8b) and formed of an elastic material capable of increasing the range of closure in accordance with the expansion of the wrapper tube 2 caused by the irradiation. Specifically, as illustrated in FIG. 17, the coolant blocking member 17 includes the contact pieces 18a, 18b, and 18c, which project from the outer circumferential side of the liner tube 8 (8b) to come in contact with the inner surface of the wrapper tube 2.

Further, the coolant blocking member 17 is a skirt-shaped member hanging from the upper end portion of the liner tube 8 (8b) along the outer circumferential surface of the liner tube, and is configured to include the contact pieces 18a, 18b, and 18c, which are a plurality of divided pieces divided by vertically extending grooves 18 to individually come in contact with the inner circumferential surface of the wrapper tube 2. It is preferable to form the coolant blocking member 17 from a high nickel steel such as Inconel (Trade Name), for example. Thus formed, the coolant blocking member 17 can keep the spring force thereof for a long time.

Figure 12:
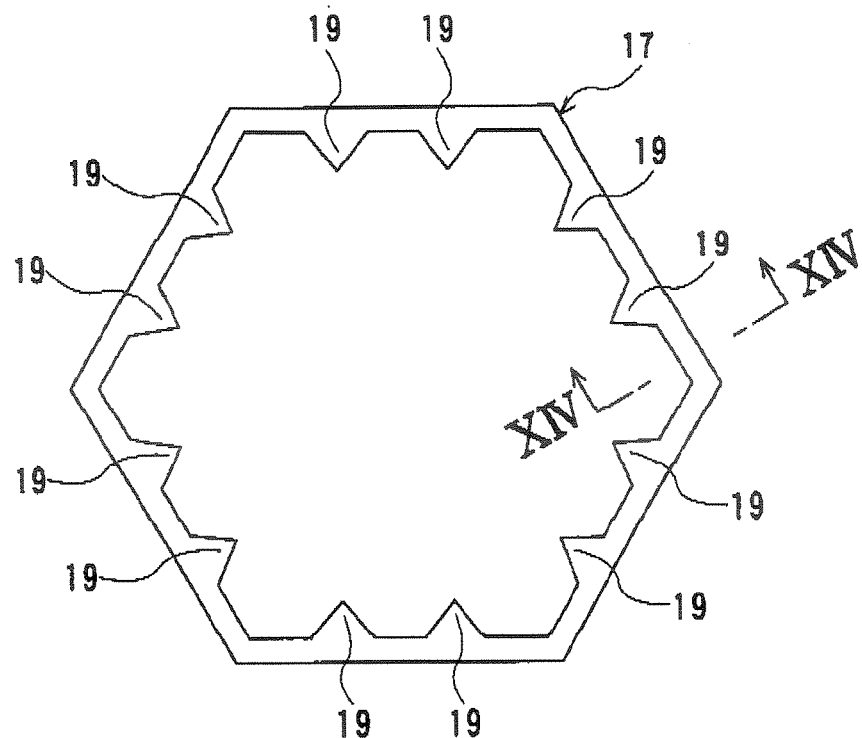
FIG. 12 is a plan view of the coolant blocking member illustrated in FIG. 11.
Figure 13:
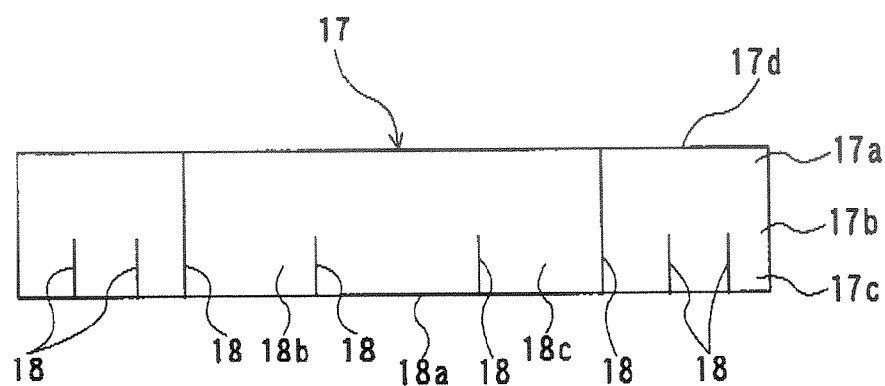
FIG. 13 is a side view of the coolant blocking member.
Figure 14:
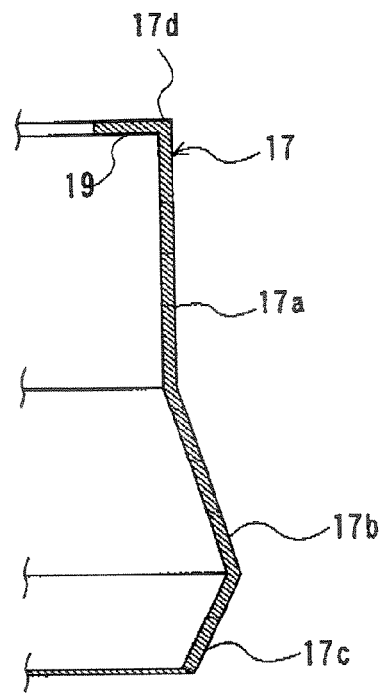
FIG. 14 is a cross-sectional view of the coolant blocking member (a cross-sectional view taken along the line XIV-XIV in FIG. 12)
Figure 15:
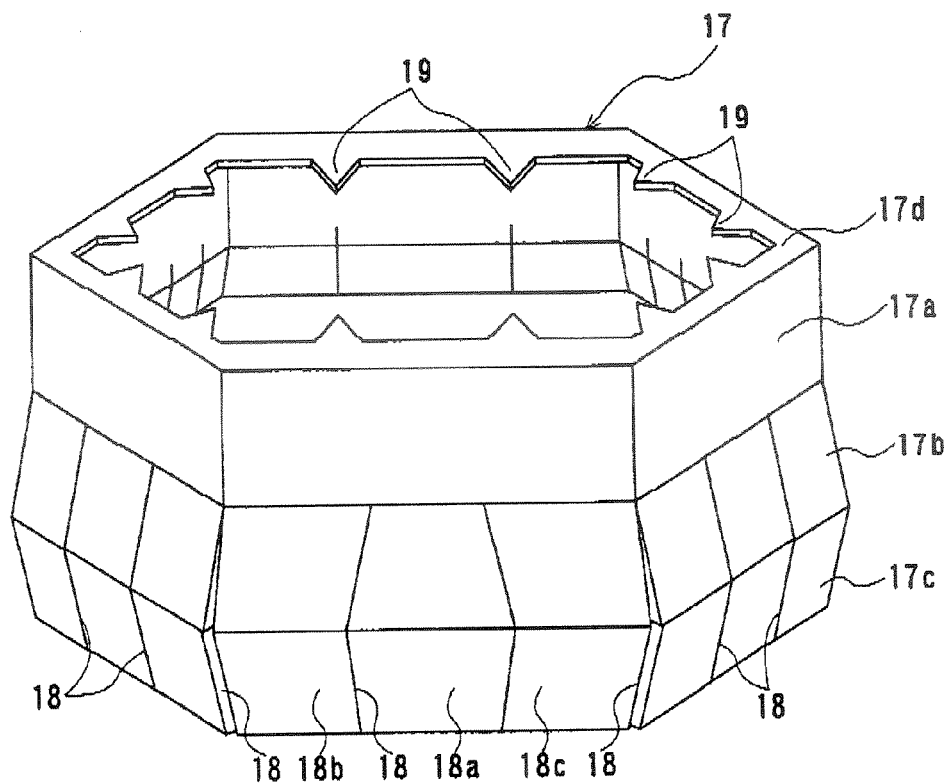
FIG. 15 is a perspective view of the coolant blocking member.
Figure 16:
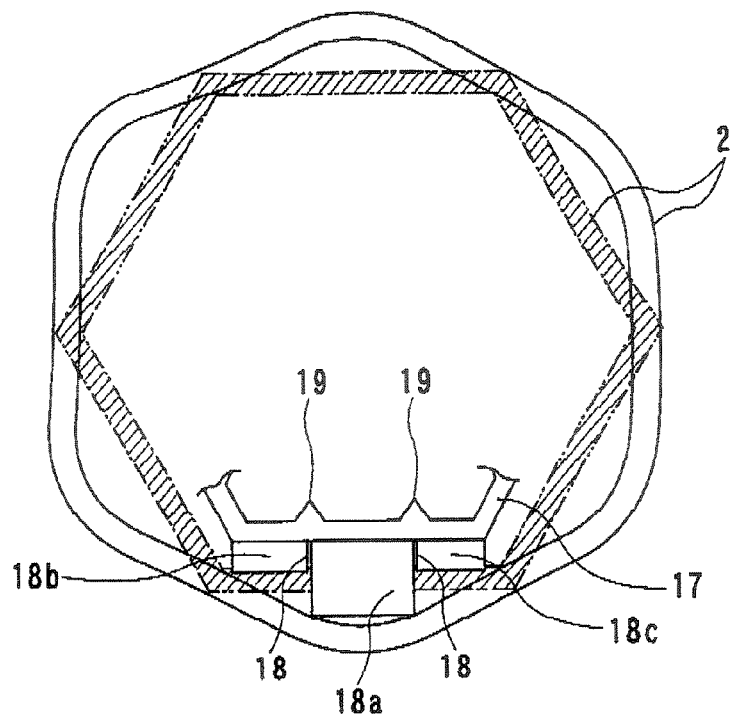
FIG. 16 is a plan view illustrating the action of the coolant blocking member.

FIG. 12 is a plan view illustrating the configuration of the coolant blocking member 17 illustrated in FIG. 11, and FIG. 13 is a side view similarly illustrating the configuration of the coolant blocking member 17. FIG. 14 is a cross-sectional view (a cross-sectional view of FIG. 12 taken along the line XIV-XIV) illustrating the specific configuration of the coolant blocking member 17, and FIG. 15 is a perspective view of the coolant blocking member 17. FIG. 16 is a plan view illustrating the action of the coolant blocking member 17, and FIG. 17 is a vertical cross-sectional view of the coolant blocking member 17. In FIG. 16, if the wrapper tube 2 is expanded from a state indicated by a virtual line into a state indicated by a solid line due to the thermal expansion occurring in the operation, the contact piece 18a positioned at the center of each of the sides of the coolant blocking member 17 follows the expanded wrapper tube 2 and moves toward a central portion of the corresponding one of the sides of the wrapper tube 2, which is the most expanded portion of the wrapper tube 2. Thereby, the contact piece 18a comes in contact with the inner surface of the wrapper tube 2, and the space on the inner circumferential side of the wrapper tube 2 can be closed. Further, as illustrated in FIG. 12, an upper end portion of the liner tube 8 (8b) is provided with the closure portions 19 for closing the space on the outer circumferential side of the parts of the concave and convex wall closing the gaps between the peripherally disposed ones of the fuel pins 5.

Figure 17:
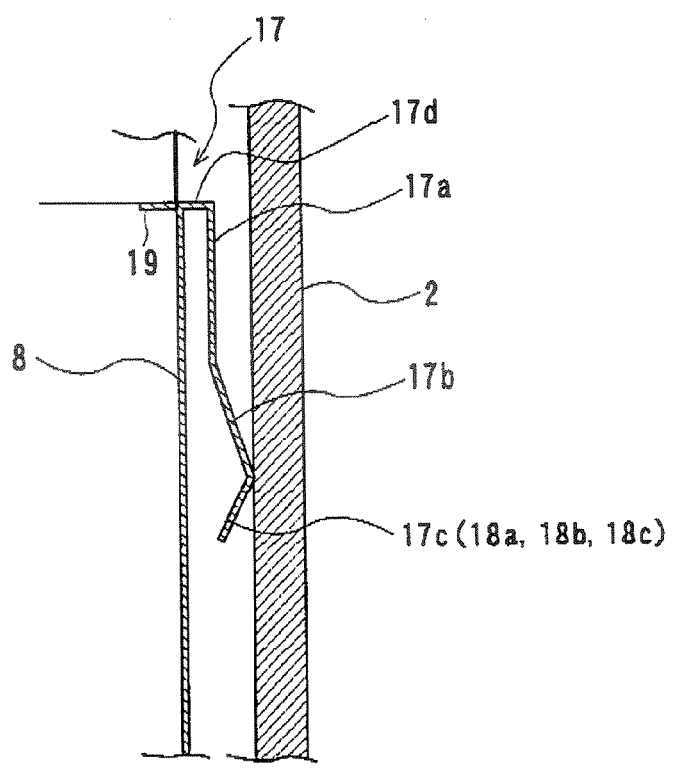
FIG. 17 is a vertical cross-sectional view illustrating the coolant blocking member.

As illustrated in FIGS. 15 and 17, the skirt-shaped coolant blocking member 17 is divided into an upper portion 17a not formed with the grooves 18, an intermediate portion 17b formed with the grooves 18 and flared in a skirt shape, and a lower end portion 17c gradually bent inward toward the lower side. An uppermost portion 17d serves as a connection portion connected to the liner tube 8 (8b).

Although not illustrated, the present embodiment may be configured such that an end portion of either one of the grid frame of the grid 9 and the liner tube 8 (8b) is provided with the closure portions for closing the space on the outer circumferential side of the parts of the convex and concave wall closing the gaps between the peripherally disposed ones of the fuel pins 5.

As described above, the present embodiment is configured such that the coolant blocking member 17 is provided on the outer circumferential surface side of the liner tube 8 (8b) for preventing the coolant from flowing in the gap between the outer circumferential surface of the liner tube 8 (8b) and the inner circumferential surface of the wrapper tube 2, and that the coolant blocking member 17 includes the contact pieces 18a, 18b, and 18c formed of an elastic material capable of increasing the range of closure in accordance with the expansion of the gap caused by the expansion of the wrapper tube 2 due to the irradiation expansion. The present embodiment is further configured such that the coolant blocking member 17 is formed as a ring-shaped spring plate, which is disposed on the outer circumferential surface side of the liner tube 8 (8b) along the circumferential direction, and which includes the contact pieces 18a, 18b, and 18c formed by a plurality of divided pieces divided by the vertically formed grooves 18 to individually come in contact with the inner circumferential surface of the wrapper tube 2.

According to the present embodiment, therefore, even if a flow passage is opened in the gap between the wrapper tube 2 and the liner tube 8, an unnecessary flow of the coolant can be prevented by the coolant blocking member 17. Further, the present embodiment has a configuration similar to the configuration of the first embodiment. Thus, the liner tubes 8 and the grids 9 are alternately stacked to determine the positions of the grids 9, and the mutual relative positions of the liner tubes 8 and the grids 9 are fixed by using the latch pins 11 between the liner tubes 8 and the grids 9. A misalignment in the radial direction can be thereby prevented. Furthermore, the communication holes 14 are formed to communicate the internal pressure of the liner tubes 8 with the internal pressure of the wrapper tube 2. Accordingly, the deformation of the liner tubes 8 can be prevented.

Further, the so-called gap flow preventing plate is provided in the gap between the wrapper tube 2 and the liner tubes 8 to prevent the coolant from flowing in the gap even if the liner tubes 8 and the grids 9 are misaligned. The deformation is greater in a near-center portion than in a corner portion of each of the surfaces of the wrapper tube 2. Since the above gap flow preventing plate has a structure of a spring divided in the circumferential direction, the gap flow preventing plate can reliably close the flow passage even if there is such a difference in expansion.

Third Embodiment

Figure 18:
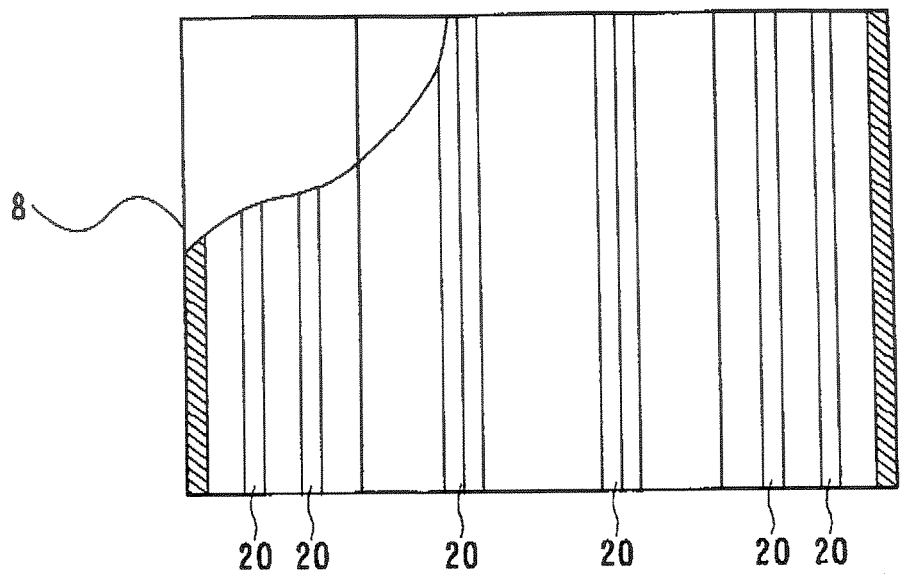
FIG. 18 is a schematic view illustrating a third embodiment of the fuel assembly according to the present invention.
Figure 19:
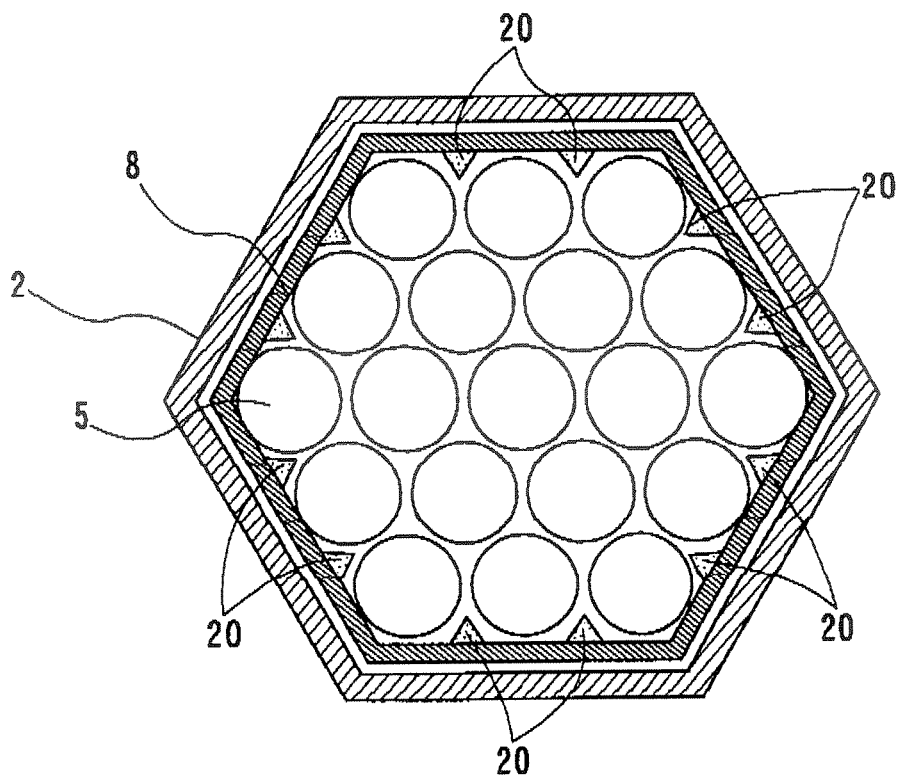
FIG. 19 is a transverse cross-sectional view of FIG. 18.

FIGS. 18 and 19

FIG. 18 is a partial cross-sectional view illustrating a third embodiment of the present invention, and FIG. 19 is a transverse cross-sectional view of FIG. 18.

As illustrated in the above figures, in the present embodiment, the inner circumferential surface of the liner tube 8 is provided with a plurality of rods 20 extending along the axial direction. Each of the rods 20 has a substantially angular cross section and is disposed in accordance with the pin pitch of fuel pins 5. Further, the rods 20 are configured to close the gaps between the outer peripherally disposed ones of the fuel pins 5. That is, the inner circumferential surface of the liner tube 8 is provided with the plurality of the rods 20, each of which has the substantially angular cross section, and which are disposed in accordance with the pin pitch of the fuel pins 5 along the axial direction to close the gap between the inner circumferential surface of the liner tube 8 and the fuel pins 5.

According to the present embodiment, a peripheral flow can be prevented by providing the peripheral flow preventing rods 20, each of which has a triangular cross section, instead of forming the peripheral flow preventing structure.

Fourth Embodiment

Figure 20:
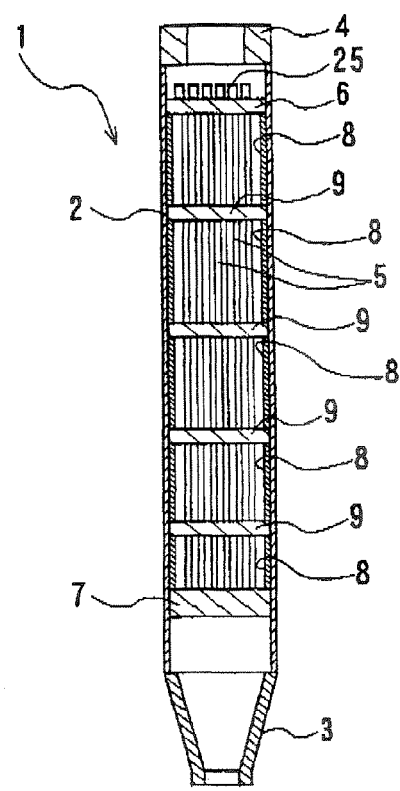
FIG. 20 is a schematic view illustrating a fourth embodiment of the fuel assembly according to the present invention.
Figure 21:
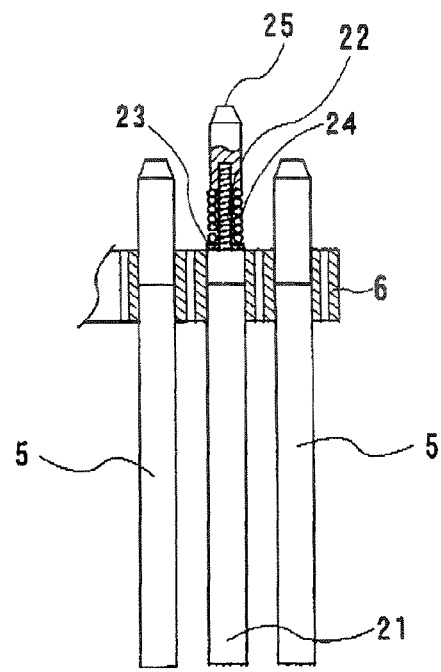
FIG. 21 is a partially enlarged cross-sectional view of FIG. 20.
Figure 22:
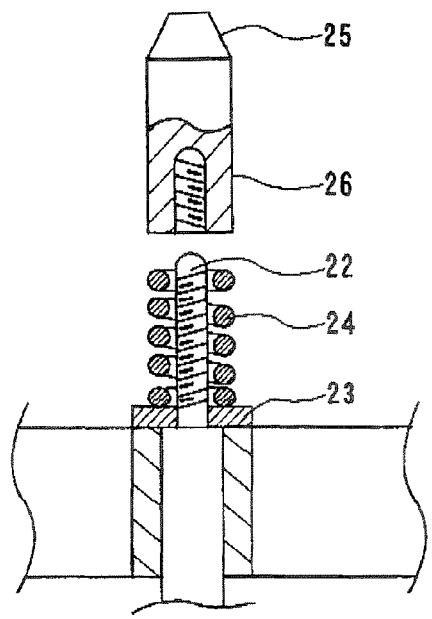
FIG. 22 is an enlarged view of main parts of FIG. 21.
Figure 23:
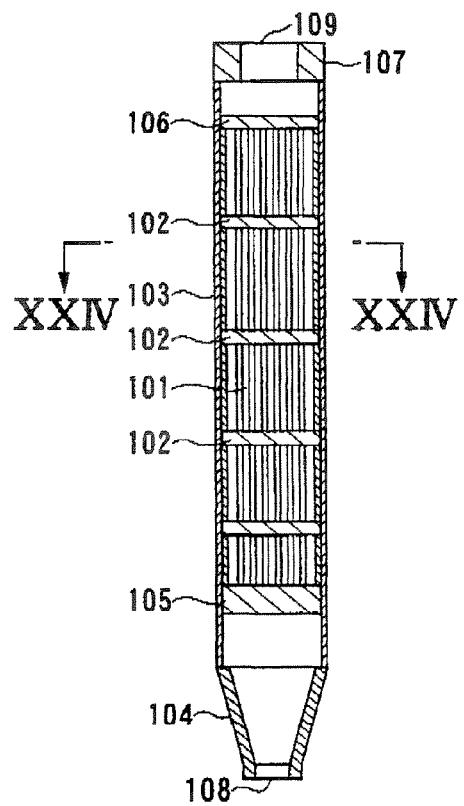
FIG. 23 is a schematic view illustrating a conventional example.
Figure 24:
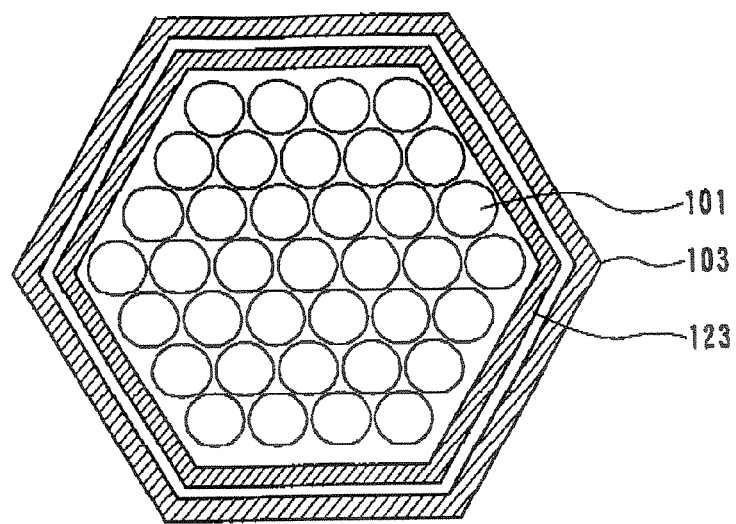
FIG. 24 is a cross-sectional view taken along the line XXIV-XXIV in FIG. 23.

FIGS. 20 to 22

FIG. 20 is a schematic view illustrating a fourth embodiment of the present invention, and FIG. 21 is a partially enlarged cross-sectional view of FIG. 20. Further, FIG. 22 is an enlarged view of main parts of FIG. 21.

The present embodiment is configured such that an upper end portion in the wrapper tube 2 is provided with the upper pin support plate 6 for supporting the fuel pins 5, and that a tie rod 21 penetrating the upper pin support plate 6 has an upper end which can be pressed down by an upper end plug 25 via an elastic member 24 such as a compression coil spring. The grids 9 and the liner tubes 8 are pressed and held downward by the elastic member 24.

That is, an upper pin support ring 23 is provided at an upper end position in the wrapper tube 2, and the upper end of the tie rod 21 penetrating the upper pin support ring 23 is pressed down by the upper end plug 25 via the elastic member 24 such as a compression coil spring. Thus, the grids 9 and the liner tubes 8 are pressed and held downward by the elastic member 24 with the elastic force.

According to the above-described configuration, the entirety of the components can be held by causing the upper end plug 25 of the tie rod 21 (the fuel pin 5) to press the uppermost grid 9 via the elastic member 24 in a manner such that the liner tubes 8 and the grids 9 will not be misaligned. Accordingly, even if the expansion occurs due to the heat of the fuel and the irradiation, the entirety of the components can be reliably held by causing the fuel pin 5 itself to pull the entirety of the components. At the same time, the other fuel pins 5 are allowed to freely expand.

It is preferable to provide a ring having the same shape as the shape of the outer diameter of the ring element to properly apply the elastic force of the elastic member 24 to the grid 9 to thereby reliably apply the pressing force to the grid 9.

With the liner tubes 8 and the grids 9 thus held with the elastic member 24 by the upper end plug 25 of one of the fuel pins 5, the fuel pins 5, the grids 9, and the liner tubes 8 can be integrally handled, and the free expansion of the other fuel pins 5 is not interrupted.

The present invention is not limited to the embodiments described above, and other alterations and modifications may be made in the present invention as long as not departing from the scope of the appended claims.

What is claimed is:

1. A nuclear reactor fuel assembly, comprising:
   a wrapper tube including a liquid metal coolant entrance nozzle and an operation handling head, the wrapper tube storing a plurality of fuel pins;
   grids disposed in the wrapper tube to support the fuel pins in a radial direction of the wrapper tube;
   liner tubes inserted in the wrapper tube to fixedly hold the respective grids in an axial direction of the wrapper tube; and
   a fixing device for fixing adjacent ones of the grids and the liner tubes in the radial direction of the wrapper tube, the fixing device including:
      fixing pins for fixing joining ends of the respective grids and the liner tubes to each other along the radial direction of the wrapper tube, and
      pin support portions comprising through holes formed on an outer circumferential side of a grid frame of each grid, wherein the through holes vertically align with engaging portions disposed in a vicinity of corner portions of surfaces of the liner tubes adjacent to upper and lower surfaces of the grid frame, and the fixing pins are inserted in the engaging portions and the through holes in the axial direction to extend entirely through the through holes.

2. The fuel assembly according to claim 1, wherein the liner tubes are arranged alternately with the grids along the axial direction of the wrapper tube.

3. The fuel assembly according to claim 1, wherein the engaging portions are grooves formed in surfaces of the liner tube along the radial direction thereof.

4. The fuel assembly according to claim 1, wherein the fixing pins extend across the grid and engaging portions above and below the grid.

5. The fuel assembly according to claim 1, wherein a length of the fixing pins is substantially equal to a length of the grid in the axial direction plus a length of respective engaging portions above and below the grid.

* * * * *